US012249298B2

(12) United States Patent
Yang et al.

(10) Patent No.: US 12,249,298 B2
(45) Date of Patent: Mar. 11, 2025

(54) METHOD FOR REDUCING GAMUT MAPPING LUMINANCE LOSS

(71) Applicant: QUALCOMM Incorporated, San Diego, CA (US)

(72) Inventors: Xinchao Yang, Shanghai (CN); Nan Zhang, Beijing (CN); Yongjun Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 167 days.

(21) Appl. No.: 17/926,036

(22) PCT Filed: Jul. 21, 2020

(86) PCT No.: PCT/CN2020/103246

§ 371 (c)(1),
(2) Date: Nov. 17, 2022

(87) PCT Pub. No.: WO2022/016366

PCT Pub. Date: Jan. 27, 2022

(65) Prior Publication Data

US 2023/0093744 A1 Mar. 23, 2023

(51) Int. Cl.
*G09G 5/36* (2006.01)
*G09G 5/00* (2006.01)
*G09G 5/02* (2006.01)

(52) U.S. Cl.
CPC ............. *G09G 5/363* (2013.01); *G09G 5/005* (2013.01); *G09G 5/02* (2013.01);
(Continued)

(58) Field of Classification Search
CPC .......... G09G 5/363; G09G 5/005; G09G 5/02; G09G 2320/0666; G09G 2370/04; G09G 2370/10
(Continued)

(56) References Cited

U.S. PATENT DOCUMENTS 6,721,069 B1 * 4/2004 Harrington .......... H04N 1/6058 358/3.09
8,704,895 B2 4/2014 Safaee-Rad et al.
(Continued)

FOREIGN PATENT DOCUMENTS

CN 1535033 A 10/2004
CN 105957111 A 9/2016
(Continued)

OTHER PUBLICATIONS

Yasuo Suzuki Image Processing Apparatus Mar. 8, 2017 Canon KK CN106488078 (A) paragraphs [0023]-[0117], figures 1-13 English.*
(Continued)

*Primary Examiner* — Prabodh M Dharia
(74) *Attorney, Agent, or Firm* — Procopio, Cory, Hargreaves & Savitch

(57) ABSTRACT

This disclosure provides systems, devices, apparatus and methods, including computer programs encoded on storage media, for reducing gamut mapping luminance loss. A gain value of at least one primary color may be reduced in a native color gamut based on an analog technique (e.g., using a DDIC in a display panel) to provide a reduced color gamut that is smaller than the native color gamut. The reduced color gamut may have a same luminance as the native color gamut. One or more colors included in the native color gamut may be mapped via a digital technique (e.g., using a DPU or other processor) to the reduced color gamut. The mapping may be configured to provide a threshold level of color accuracy in the reduced color gamut.

18 Claims, 6 Drawing Sheets

(52) U.S. Cl.
CPC . *G09G 2320/0666* (2013.01); *G09G 2370/04* (2013.01); *G09G 2370/10* (2013.01)

(58) Field of Classification Search
USPC ............ 345/88, 501, 529; 315/294; 358/1.9, 358/3.09; 348/E7.003, E9.027
See application file for complete search history.

(56) References Cited

U.S. PATENT DOCUMENTS

| | | | | |
|---|---|---|---|---|
| 2002/0140904 | A1* | 10/2002 | Brennesholtz | H04N 9/3182 348/E9.027 |
| 2008/0068510 | A1 | 3/2008 | Kanai | |
| 2010/0060911 | A1* | 3/2010 | Marcu | G09G 5/02 358/1.9 |
| 2010/0149203 | A1* | 6/2010 | Mebane | G09G 5/02 345/589 |
| 2010/0302439 | A1* | 12/2010 | Le | H04N 9/67 348/E7.003 |
| 2012/0218572 | A1 | 8/2012 | Kishino et al. | |
| 2013/0093783 | A1 | 4/2013 | Sullivan et al. | |
| 2013/0222414 | A1 | 8/2013 | Ito et al. | |
| 2014/0340434 | A1* | 11/2014 | El-Ghoroury | G09G 3/3413 345/88 |
| 2015/0379961 | A1* | 12/2015 | Masuyama | G09G 5/10 315/294 |
| 2017/0061594 | A1 | 3/2017 | Suzuki | |
| 2019/0356891 | A1* | 11/2019 | Zhang | G09G 5/02 |
| 2021/0097943 | A1* | 4/2021 | Wyatt | H10K 59/352 |

FOREIGN PATENT DOCUMENTS

| | | | |
|---|---|---|---|
| CN | 106488078 | A | 3/2017 |
| CN | 107680556 | A | 2/2018 |
| CN | 111341283 | A | 6/2020 |
| JP | 2008236083 | A | 10/2008 |
| JP | 2019126025 | A | 7/2019 |
| KR | 20010002261 | A | 1/2001 |
| WO | 2012072415 | A1 | 6/2012 |
| WO | 2013033175 | | 3/2013 |

OTHER PUBLICATIONS

Yasuo Suzuki Image Processing Apparatus Mar. 8, 2017 Canon KK CN106488078 (A) paragraphs [0023]-[0117], figures 1-13 Chinese.*

International Search Report and Written Opinion—PCT/CN2020/103246—ISA/EPO—Apr. 20, 2021.

Li T., et al., “Theoretical and Experimental Studies of Color Correction in Laser Digital Photofinishing”, ACTA Photonica Sinica, vol. 33, No. 6, Jun. 25, 2004, 4 Pages.

Supplementary European Search Report—EP20946489—Search Authority—Munich—Feb. 29, 2024.

Zong-Jie Z., et al., “A Moving Object Detection Method Based on Brightness Distortion and Color Distortion”, Oct. 15, 2008, 4 Pages.

* cited by examiner

METHOD FOR REDUCING GAMUT MAPPING LUMINANCE LOSS

CROSS REFERENCE TO RELATED APPLICATION(S)

This application is National Stage Application filed under 35 U.S.C. § 371 of PCT International Application No. PCT/CN2020/103246, entitled "METHOD FOR REDUCING GAMUT MAPPING LUMINANCE LOSS" and filed Jul. 21, 2020, which is expressly incorporated by reference herein in its entirety.

BACKGROUND

Technical Field

The present disclosure relates generally to processing systems, and more particularly, to a method for reducing luminance loss during gamut mapping.

Introduction

Computing devices often perform graphics processing (e.g., utilizing a graphics processing unit (GPU)) to render graphical data for display by the computing devices. Such computing devices may include, for example, computer workstations, mobile phones such as smartphones, embedded systems, personal computers, tablet computers, and video game consoles. GPUs are configured to execute a graphics processing pipeline that includes one or more processing stages which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

Some computing devices may be associated with a display system configured to display content based on more than one color gamut and/or display content based on a smaller color gamut than that represented in generated content. A color gamut may define a range of colors within a color spectrum that a display panel of the display system may be configured to display. Accordingly, there is a need for improved techniques for switching between color gamuts used to display the content.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some display panels and/or display systems may be configured to display content by switching between different color gamuts (e.g., a wide color gamut (WCG) and/or a standard color gamut). Different techniques may be utilized for switching from a larger color gamut to a smaller color gamut, so that content generated based on the larger color gamut may be displayed via the smaller color gamut. In an example, a display driver integrated circuit (DDIC) of a display panel may reduce a gain value of at least one primary color in an analog domain to provide the smaller color gamut. By adjusting only the gain value of the primary colors, a luminance of the colors in the smaller color gamut may be preserved from the larger color gamut. However, other colors of the smaller color gamut may be shifted based on the reduction of the gain value(s) of the at least one primary color and may result in color accuracy errors within the reduced color gamut. In another example, a display processing unit (DPU) may map the colors of the larger color gamut to the smaller color gamut. As mapping may be performed in a digital domain based on specific color mapping protocols, a threshold level of color accuracy may be provided to the smaller color gamut. However, digital mapping techniques may cause a luminance loss of greater than a threshold amount in comparison to reducing the larger color gamut to the smaller color gamut in the analog domain.

Accordingly, a hybrid analog/digital technique may be performed that provides the threshold level of color accuracy while maintaining the luminance loss below the threshold amount. The smaller color gamut may be initially provided via an analog technique that preserves luminance based on a reduction to the gain value(s) of the at least one primary color. Subsequently, a post-processing/mapping technique may be performed using a digital technique on the smaller color gamut to correct color accuracy errors in the smaller color gamut that may cause the color accuracy to be below the threshold level of color accuracy. The post-processing/mapping technique may be performed based on the smaller color gamut provided by the analog technique that preserves the luminance from the larger color gamut. In this manner, the smaller color gamut having the threshold level of color accuracy may be provided with less luminance loss than a smaller color gamut provided from a direct mapping by the digital technique that is performed independently of analog techniques.

In an aspect of the disclosure, a method, a computer-readable medium, and an apparatus are provided. The apparatus may include a memory and at least one processor coupled to the memory. The at least one processor may be configured to reduce a gain value of at least one primary color in a native color gamut, the reduction providing a reduced color gamut that is smaller than the native color gamut, the reduced color gamut having a same luminance as the native color gamut, and map one or more colors included in the native color gamut to the reduced color gamut, the mapping configured to provide a threshold level of color accuracy in the reduced color gamut.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
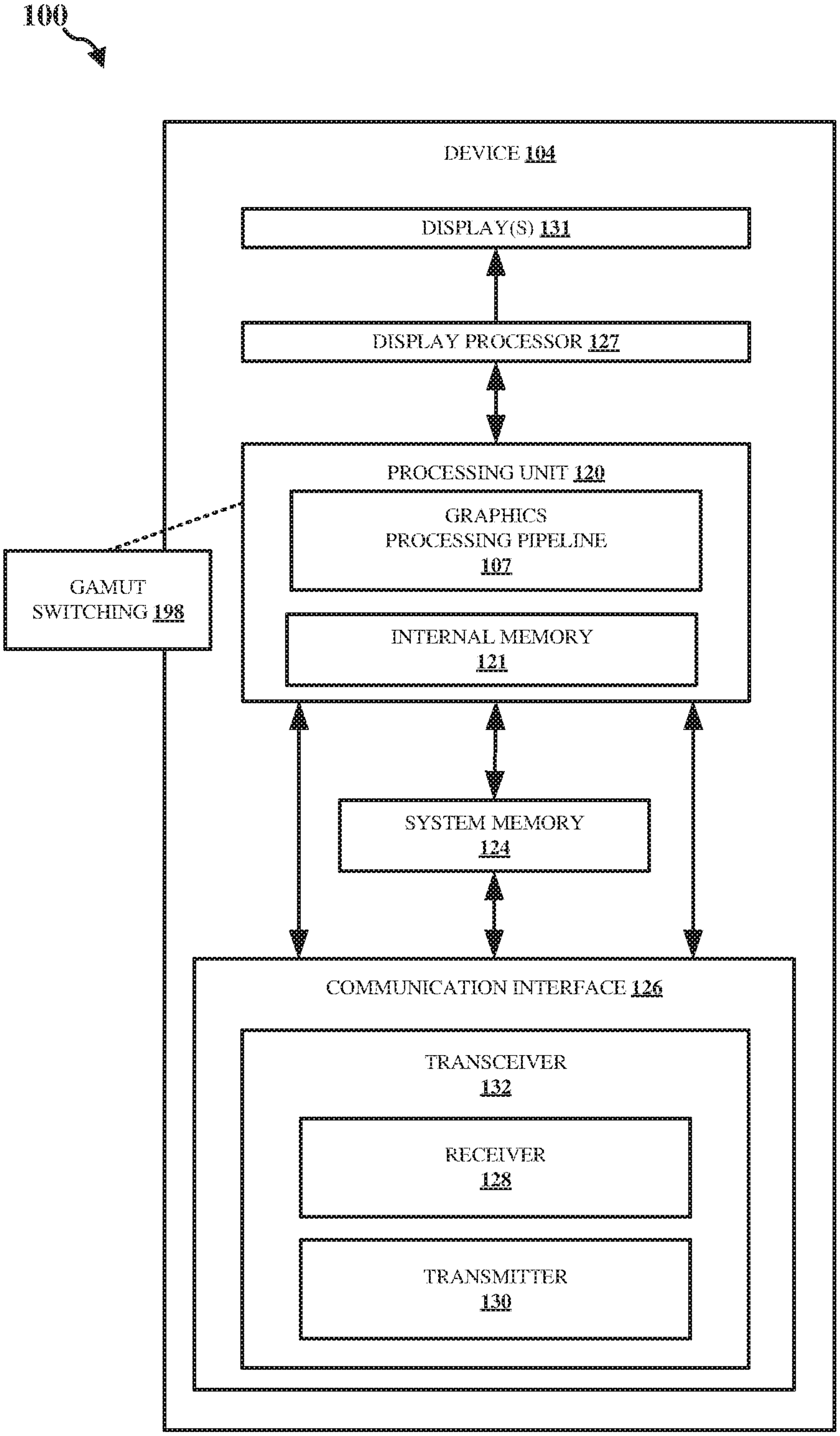
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Some display panels and/or display systems may be configured to display content by switching between different color gamuts (e.g., a wide color gamut (WCG) and/or a standard color gamut). Different techniques may be utilized for switching from a larger color gamut to a smaller color gamut, so that content generated based on the larger color gamut may be displayed via the smaller color gamut. In an example, a display driver integrated circuit (DDIC) of a display panel may reduce a gain value of at least one primary color in an analog domain to provide the smaller color gamut. By adjusting only the gain value of the primary colors, a luminance of the colors in the smaller color gamut may be preserved from the larger color gamut. However, other colors of the smaller color gamut may be shifted based on the reduction of the gain value(s) of the at least one primary color and may result in color accuracy errors within the reduced color gamut. In another example, a display processing unit (DPU) may map the colors of the larger color gamut to the smaller color gamut. As mapping may be performed in a digital domain based on specific color mapping protocols, a threshold level of color accuracy may be provided to the smaller color gamut. For example, a threshold level of color accuracy may be provided when a Delta-E 2000 (DE2000) color difference between the initial color in the larger color gamut and the mapped color in the smaller color gamut is less than or equal to 3. However, digital mapping techniques may cause a luminance loss of greater than a threshold amount in comparison to reducing the larger color gamut to the smaller color gamut in the analog domain. For example, the luminance of the mapped color in the smaller color gamut may be reduced (or lost) by at least 10% (e.g. by 10-20%) with respect to the luminance of the initial color in the larger color gamut.

Accordingly, a hybrid analog/digital technique may be performed that provides the threshold level of color accuracy (e.g. a DE2000 color difference <=3) while maintaining the luminance loss below the threshold amount (e.g. less than 10% loss in luminance). In an example, the smaller color gamut may be initially provided via an analog technique that preserves luminance based on a reduction to the gain value(s) of the at least one primary color. Subsequently, post-processing/mapping may be performed using a digital technique on the smaller color gamut to correct color accuracy errors in the smaller color gamut that may cause the color accuracy to be below the threshold level of color accuracy (e.g. color accuracy errors resulting in a DE2000 color difference >3). The post-processing/mapping technique may be performed based on the smaller color gamut provided by the analog technique that preserves the luminance from the larger color gamut. In this manner, the smaller color gamut having the threshold level of color accuracy may be provided with less luminance loss than a smaller color gamut provided from a direct mapping by the digital technique that is performed independently of analog techniques.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120 and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. In some examples, the device 104 may include a display processor, such as the display processor 127, to perform one or more display processing techniques on one or more frames generated by the processing unit 120 before the frames are displayed by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to the internal memory 121 over the bus or via a different connection. The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include and/or be configured to perform gamut switching 198 to reduce a gain value of at least one primary color in a native color gamut, the reduction providing a reduced color gamut that is smaller than the native color gamut, the reduced color gamut having a same luminance as the native color gamut; and map one or more colors included in the native color gamut to the reduced color gamut, the mapping configured to provide a threshold level of color accuracy in the reduced color gamut. Depiction and reference to the gamut switching 198 as a "component" is for ease of explanation and does not necessarily correspond to a specific hardware component in the processing unit 120. For example, the gamut switching 198 may be configured as code, logic, etc.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
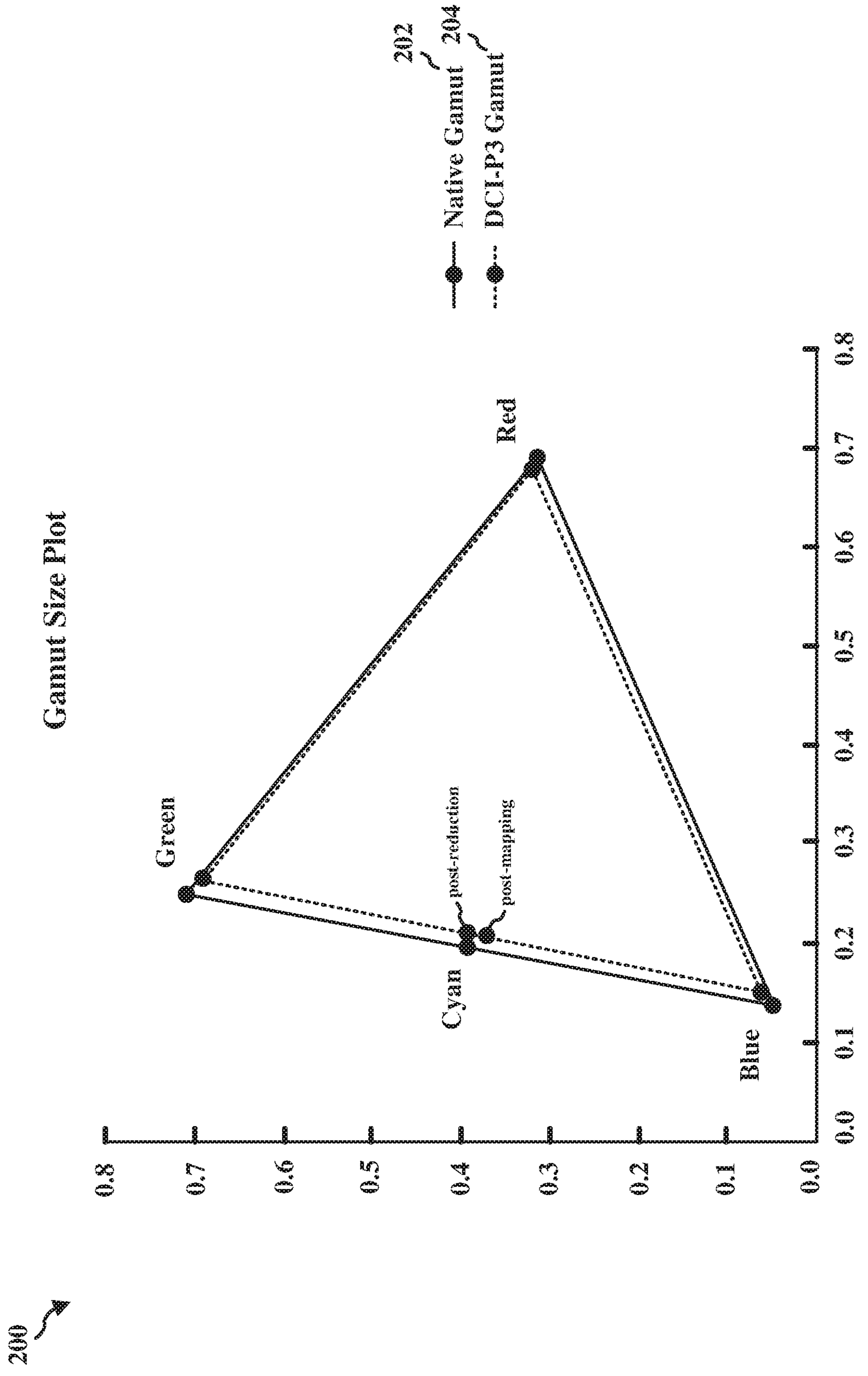
FIG. 2 illustrates gamut plots for a plurality of color gamuts in accordance with one or more techniques of this disclosure.
Figure 3:
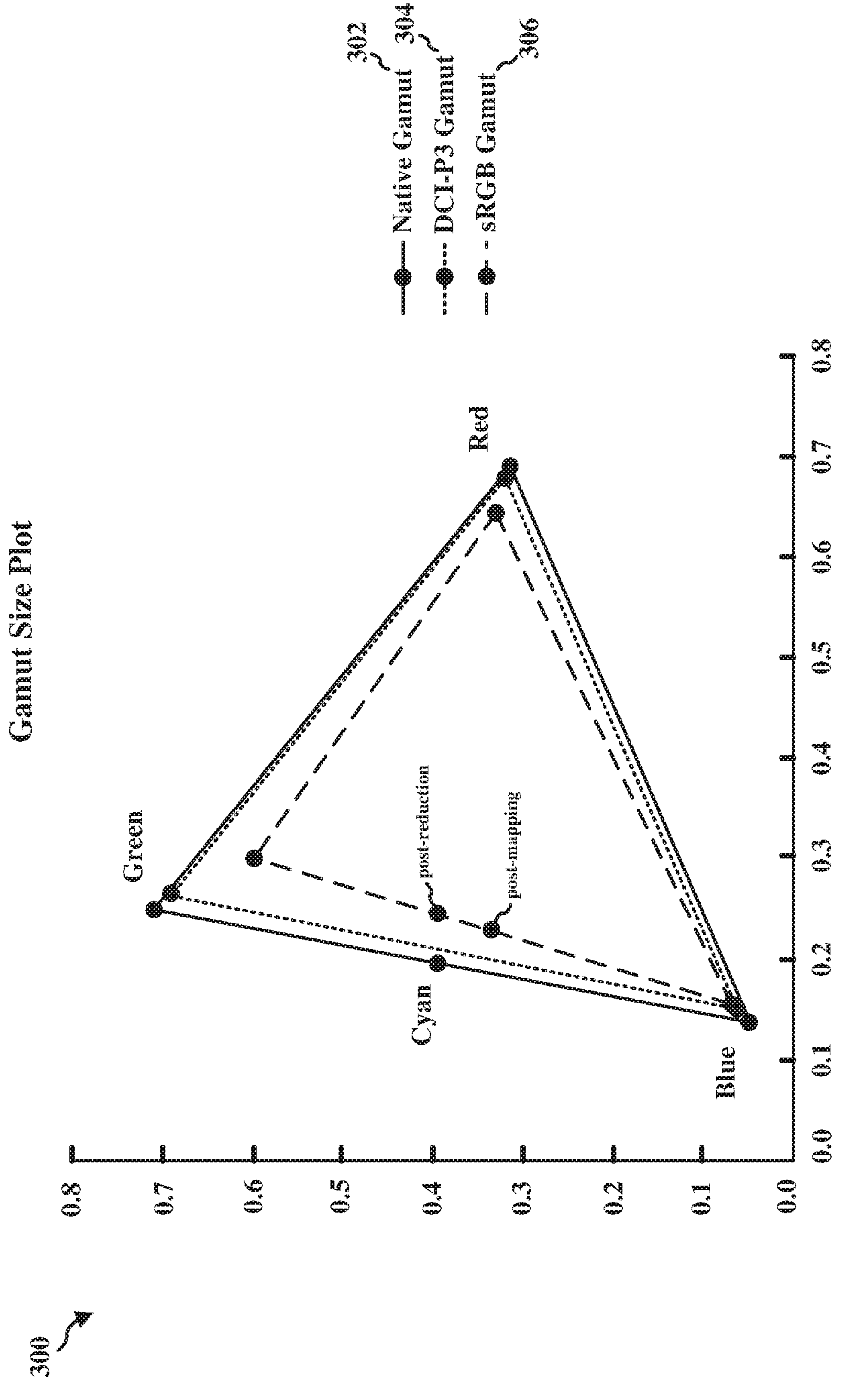
FIG. 3 illustrates gamut plots for a plurality of color gamuts in accordance with one or more techniques of this disclosure.

FIGS. 2-3 illustrate gamut plots 200-300 for a plurality of color gamuts. The plurality of color gamuts may include a native color gamut 202-302, a digital cinema initiatives P3 (DCI-P3) color gamut 204-304, and a standard red-green-blue (sRGB) color gamut 306. The native color gamut 202-302 may include more colors in a color space than the DCI-P3 color gamut 204-304. The DCI-P3 color gamut 204-304 may include more colors in the color space than the sRGB color gamut 306. The native color gamut 202-302 and/or the DCI-P3 color gamut 204-304 may correspond to a wide color gamut (WCG) and the sRGB color gamut 306 may correspond to a standard color gamut.

Some display panels and/or display systems may be configured to display content based on different color gamuts (e.g., based on switching between the DCI-P3 color gamut 204-304, the sRGB color gamut 306, amongst others). For display panels such as organic light-emitting diode (OLED) panels and liquid crystal display (LCD) panels, a native color gamut 202-302 may have a color range that is larger than 100% of a national television system committee-system M (NTSC-M) color gamut. The NTSC-M color gamut may correspond to a defined range of colors that a display panel may be expected to reproduce. Thus, the NTSC-M color gamut may be used as a reference gamut for determining/measuring a size of other color gamuts. For example, the size of the DCI-P3 color gamut 204-304 may be 96% of the NTSC-M color gamut and the size of the sRGB color gamut 306 may be 72% of the NTSC-M color gamut.

In configurations, two different techniques may be utilized for shrinking the native color gamut 202-302 of the display panel into a smaller color gamut, such as the DCI-P3 color gamut 204-304 or the sRGB color gamut 306. For example, a first or analog technique may be for a display driver integrated circuit (DDIC) included in the display panel (e.g. in display 131) to reduce the native color gamut 202-302 of the display panel in an analog domain. A "reduction" of the native color gamut 202-302 refers to adjusting a gain value of an additive primary color such as red, green, and blue which may, for example, result in modifications to white levels/highlights of the displayed content. For instance, in one example of an analog technique, in response to an instruction from processing unit 120, the DDIC may adjust the gain value of an additive primary color or sub-pixel (R, G, B) by adjusting a current or voltage for that sub-pixel in the display 131. Adjusting the gain value in one direction or the other may cause colors to become lighter or darker, where colors of increasing brightness may be more noticeably changed while the color black (e.g., a dark color) may not have a noticeable change.

By adjusting only the gain value of the additive primary colors (e.g., red, green, and blue) in the analog domain, a luminance of the colors in the color space may be preserved from the native color gamut 202-302. However, given that a color space may include many other colors (e.g., magentas, cyans, yellows, etc.) in addition to the additive primary colors, a reduction performed by the analog technique may provide only a coarse adjustment to the other colors in the color space. For example, the other colors in the color space may not be reduced based on gaining each of the other colors. Instead, the other colors may be shifted within the color space based on the reduction of one or more of the additive primary colors. For example, when the gain of the primary color green is adjusted such that the primary color is reduced from the native gamut 202 to the DCI-P3 gamut 204 as illustrated in FIG. 2, the color cyan may be shifted (e.g. as indicated by the post-reduction label) as a result. The color shift of the other colors may thereby result in color accuracy errors within the reduced color gamut.

An (x, y) coordinate in the gamut plots 200-300 may be associated with a chromaticity of a corresponding color. The chromaticity of the color may provide an objective indication of a color quality, regardless of a luminance of the color, as the chromaticity may be defined based on hue and saturation values. When a reduction is performed by the analog technique, only the gain value of one or more of the additive primary colors (e.g., red, green, and blue) is changed. The gain value of the other colors may not be directly changed in the analog domain for the reduction. That is, a coordinate associated with another color that is outside the reduced color gamut (e.g., the DCI-P3 color gamut 204-304 or the sRGB color gamut 306) may be shifted to a coordinate that is inside the reduced color gamut through a color shift caused by a reduction of at least one of the primary colors.

In a second or digital technique for shrinking the native color gamut 202-302 to a smaller color gamut, a display processing unit (DPU) (e.g. processing unit 120) may map the colors of the native color gamut 202-302 to the smaller color gamut (e.g., the DCI-P3 color gamut 204-304 or the sRGB color gamut 306). Mapping may be a more sophisticated technique than reduction, as mapping may require color modifications (e.g., to both the primary colors and the other colors) to be performed in a like manner when shrinking a larger color gamut to the smaller color gamut. More specifically, gamut mapping may be performed by associating out-of-gamut colors with in-gamut colors that have a low distinction from the out-of-gamut colors, while leaving in-gamut colors unchanged from the larger color gamut.

Gamut mapping may be performed in a digital domain based on, for example, a three-dimensional lookup table (3DLUT), a polynomial color correction (PCC), a gamma correction (GC), an inverse gamma correction (IGC), etc., to map not only the primary colors but also the other colors to the smaller color gamut. In an example, 20 or more points in the native color gamut 202-302 may be mapped to the smaller color gamut (e.g., the DCI-P3 color gamut 204-304 or the sRGB color gamut 306) to provide a threshold level of color accuracy. For instance, in one example of a digital technique, the DPU may process and adjust primary color or sub-pixel (R, G, B) values from the native color gamut to the smaller color gamut using a 3DLUT or another pixel processing block, after which the processed and adjusted pixel or sub pixel values may be input to the DDIC for display on the device 104. While receiving a plurality of color points as input for gamut mapping may provide improved color accuracy over reduction techniques, such color point mapping may result in luminance loss. For example, the colors red, green, and blue may incur a 10-20% luminance loss when a color gamut is decreased based on digital processes. Accordingly, digital techniques for shrinking a color gamut may provide a threshold level of color accuracy but may cause a luminance loss, and analog techniques for shrinking the color gamut may preserve the luminance but may cause a color accuracy error through a color shift.

In certain aspects, a hybrid analog/digital technique may be executed by initially performing a gamut reduction to preserve luminance and subsequently performing a gamut mapping to correct/account for color shifts of the reduced color gamut. For example, if the native color gamut is approximately 130% of the NTSC-M color gamut, the processing unit 120 may instruct the DDIC to adjust the gain of each primary color or sub-pixel (R, G, B) to result in a smaller color gamut which is less than or equal to 100% of the NTSC-M color gamut (e.g. the DCI-P3 color gamut 204-304 or the sRGB color gamut 306). In this manner, color accuracy may be increased with less luminance loss from the color mapping. Gamut reductions based on analog techniques may be performed by adjusting color point locations for the colors red, green, blue, and/or white within a color space based on gain value(s). A color point location for the color white may be determined based on a centralized location between the color point locations for the colors red, green, and blue.

In the gamut plot 200, the color cyan is located between the colors green and blue. When the native color gamut 202 is reduced to the DCI-P3 color gamut 204 by adjusting the gain values of the primary colors, the color cyan may be shifted from the native color gamut 202 to a post-reduction location of the DCI-P3 color gamut 204. That is, the color cyan may be shifted in the gamut plot 200 based on changes to the gain value(s) of the primary colors, and not based on color-specific changes to parameters of the color cyan (e.g., a non-primary color). The color shift may be represented, for example, by the DE2000 formula, which may be a function of input parameters including lightness of the initial color ($L_1$*), color channels of the initial color (e.g. a green-red component ($a_1$*) and a blue-yellow component ($b_1$*)), lightness of the shifted color ($L_2$*), color channels of the shifted color (e.g. a green-red component ($a_2$*) and a blue-yellow component ($b_2$*)), chroma and hue of the initial and shifted colors, a hue rotation term ($H_T$), and compensation for neutral colors, lightness, chroma and hue. One or more of these input parameters of the non-primary color may be a function of the gain values of the primary colors. For example, in response to adjusting the gain of the primary colors in the analog domain, a color shift of the color cyan from the native color gamut 202 to the DCI-P3 gamut 204 may result with a DE2000 value of 10 based on the values of the input parameters. As a result, the post-reduction location of the color cyan may include a color accuracy error. However, the luminance of the color cyan in the DCI-P3 color gamut 204 may be preserved from the native color gamut 202.

To correct the color accuracy error of the color cyan caused by the color shift, post-processing techniques (e.g., 3DLUT, PCC, GC, IGC) may be performed to map the color cyan to a post-mapping location of the DCI-P3 color gamut 204. The mapping may occur based on the post-reduction location that preserves the luminance of the color cyan, as opposed to a direct mapping of the color cyan from the native color gamut 202 to the DCI-P3 color gamut 204. Thus, less luminance may be lost from the mapping of the color cyan while providing a threshold level of color accuracy for the DCI-P3 color gamut 204. For example, using a 3DLUT or other pixel processing block, the processing unit 120 may map the color cyan from the post-reduction location illustrated in FIG. 2 (e.g., where the DE2000 value is 10) to the illustrated post-mapping location, thus changing the color channels or other input parameters to the DE2000 formula and correcting the color shift in the digital domain to a smaller DE2000 value or color accuracy error (e.g. below 3).

In the gamut plot 300, the color cyan is similarly located between the colors green and blue. When the native color gamut 302 is reduced to the sRGB color gamut 306 by adjusting the gain values of the primary colors, the color cyan may be shifted from the native color gamut 302 to a post-reduction location of the sRGB color gamut 306. That is, the color cyan may be shifted in the gamut plot 300 based on changes to the gain value(s) of the primary colors, and not based on color-specific changes to parameters of the color cyan (e.g., a non-primary color). As a result, the post-reduction location of the color cyan may include a color accuracy error. However, the luminance of the color cyan in the sRGB color gamut 306 may be preserved from the native color gamut 302. To correct the color accuracy error of the color cyan caused by the color shift, post-processing techniques (e.g., 3DLUT, PCC, GC, IGC) may be performed to map the color cyan to a post-mapping location of the sRGB color gamut 306. The mapping may occur based on the post-reduction location that preserves the luminance of the color cyan, as opposed to a direct mapping of the color cyan from the native color gamut 302 to the sRGB color gamut 306. Thus, less luminance may be lost from the mapping of the color cyan while providing a threshold level of color accuracy for the sRGB color gamut 306. For example, assuming the native color gamut 202 is 130% of the NTSC-M color gamut, the initial DE2000 value of the color cyan in the native color gamut compared to the reduced color gamut (e.g. the DCI-P3 gamut or the sRGB gamut) may be 15. Typically, the average color accuracy error in such case (e.g. the initial DE2000 value) may be between 15 and 30. In response to adjusting the gain of the primary colors in the analog domain, a color shift of the color cyan from the native color gamut to the reduced color gamut may result with a lower DE2000 value (e.g. a value of 10) or an unchanged DE2000 value based on the values of the input parameters. Then, using a 3DLUT or other pixel processing block, the color cyan may be mapped from the post-reduction location to a new post-mapping location, thus changing the color channels or other input parameters to the DE2000 formula and correcting the color shift in the digital domain to a smaller DE2000 value or color accuracy error (e.g. 3).

Figure 4:
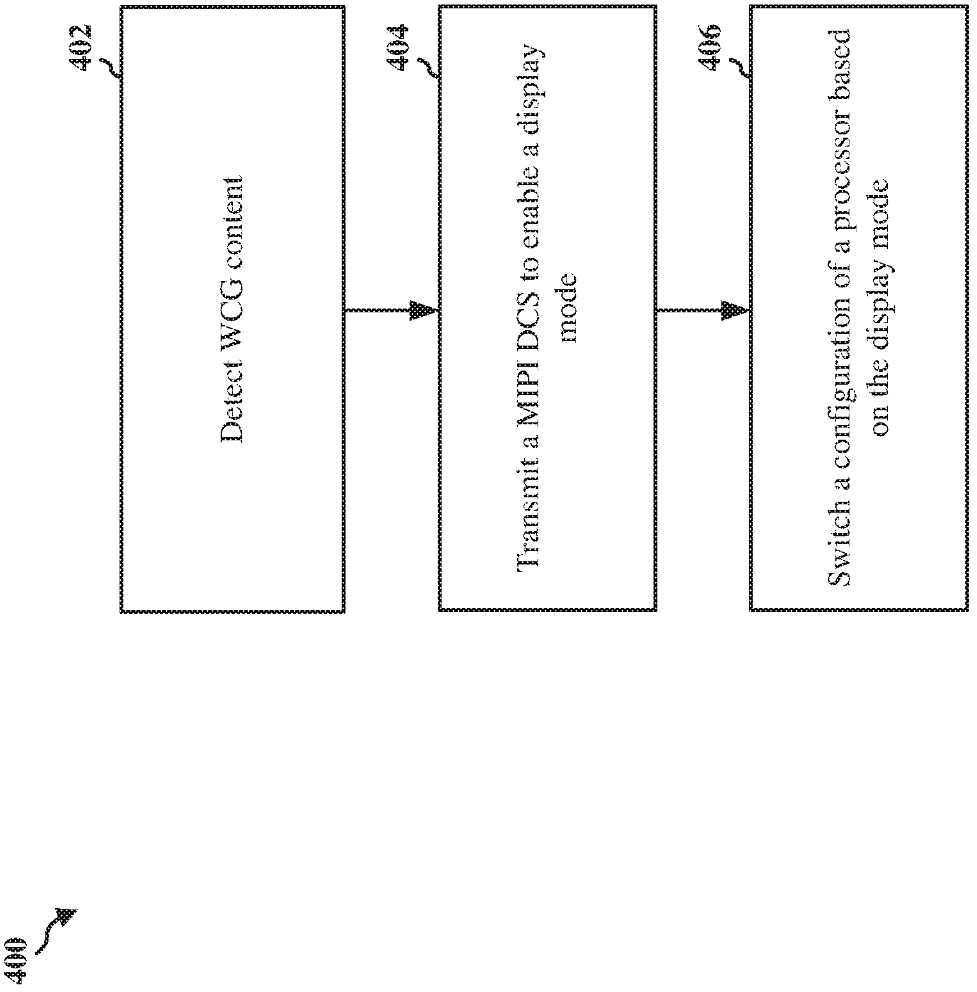
FIG. 4 is a flowchart for switching a configuration of a processor to perform post-processing in accordance with one or more techniques of this disclosure.

FIG. 4 is a flowchart 400 for switching a configuration of a processor (e.g., a DPU or a CPU) for post-processing of colors associated with a reduced color gamut. For example, the configuration of the processor may be switched from a default display mode to a display mode in which the processor implements the hybrid analog/digital technique for switching color gamuts as described above. At 402, WCG content may be detected by the processor based on detection of colors that are outside a standard color gamut. In aspects, WCG content may correspond to content generated based on a color palette that is larger than a standard color palette (e.g., a standard color palette may be 72% of the NTSC-M color palette). Based on detection of the WCG content, the processor may be configured to determine a type of the color gamut that includes the WCG content. For example, a type of the WCG may be a DCI-P3 color gamut, an Adobe RGB color gamut, an International Telecommunication Union recommendation 2020 (Rec.2020) color gamut, etc.

At 404, the processor may transmit a command set (e.g., a mobile industry processor interface (MIPI) display command set (DCS) (MIPI DCS)) to a display panel to enable a display mode of the display panel. The display mode may be configured to display mapped colors of a color gamut based on the post-processing techniques with decreased luminance loss compared to direct color mapping from a larger color gamut to a smaller color gamut. The command set may be received by the display panel (e.g., by a DDIC of the display panel). In some examples, the DDIC may be configured to control display modes of the display panel. For example, the DDIC may enable a P3 mode of the display panel for displaying content based on a DCI-P3 color gamut.

At 406, a configuration of the processor may be switched based on the display mode indicated via the command set. For example, the processor may be configured to map a color to a second location of the reduced color gamut based on a first location of the color associated with the reduction of the larger color gamut to the reduced color gamut. The display panel may display content based on a post-mapping location of the color. The P3 mode of the display panel may be based on two aspects. First, display panel (e.g., DDIC) configuration parameters (e.g., gain values for one or more primary colors) may be utilized to reduce a larger color gamut to a smaller color gamut. The configuration parameters may be converted into a single command set. For example, the command set may indicate RGB coordinates for a specific color gamut, such as the DCI-P3 color gamut. Second, the processor may be utilized to generate, measure, and/or correct an accuracy of the colors in the specific/reduced color gamut, which may be performed based on a color correction technique (e.g., via a matrix associated with color values) or a color mapping technique (e.g., GC, IGC, PCC, or 3DLUT). Color correction/mapping techniques may be performed on a color gamut subsequent to color gamut reduction techniques to provide the threshold level of color accuracy.

Figure 5:
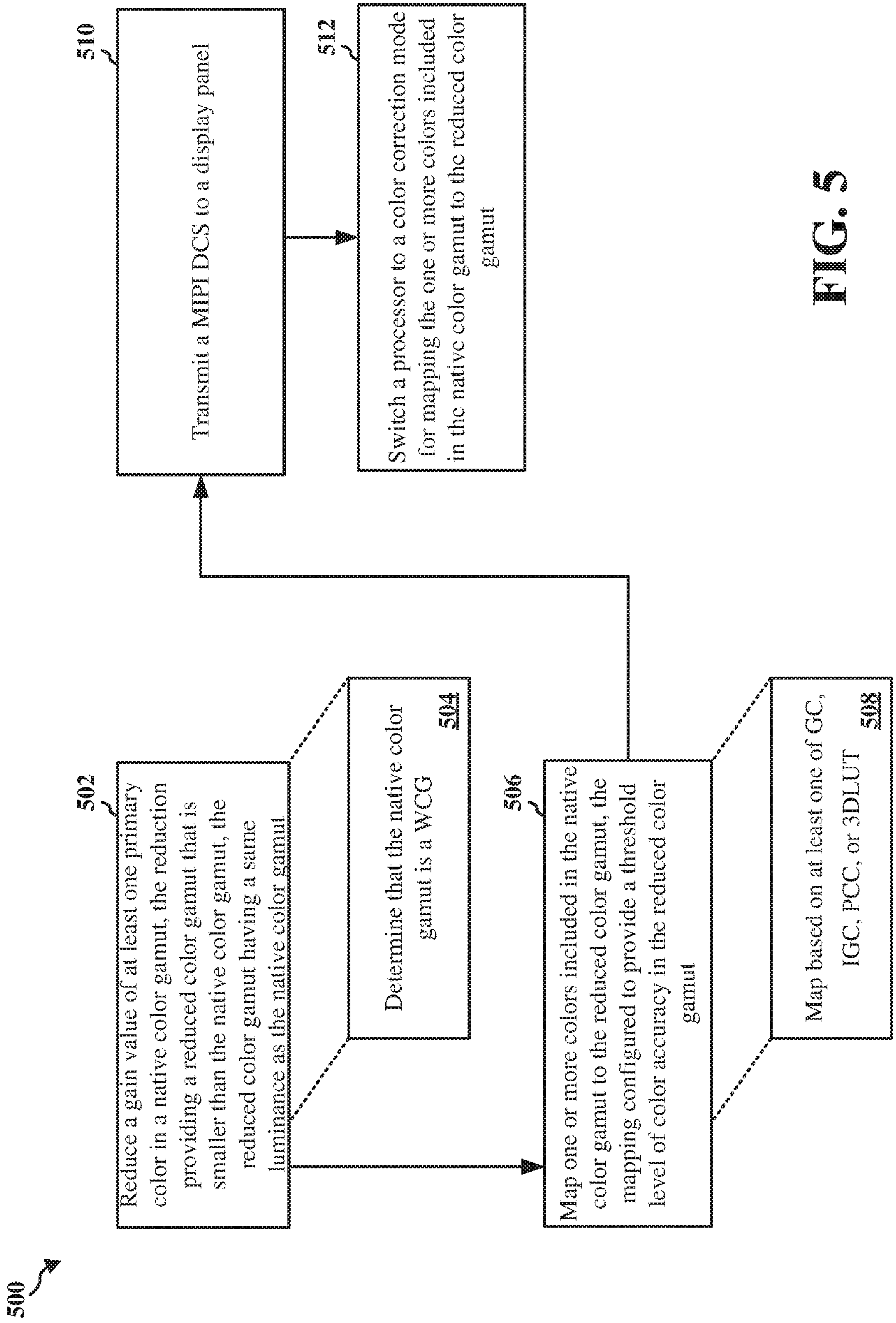
FIG. 5 is a flowchart of an example method of switching color gamuts in accordance with one or more techniques of this disclosure.

FIG. 5 is a flowchart 500 of an example method of switching color gamuts in accordance with one or more techniques of this disclosure. The method 500 may be performed by a processor, a DPU, a DDIC, an apparatus such as a wireless communication device, etc., as used in connection with the examples of FIGS. 1-4.

At 502, a gain value of at least one primary color in a native color gamut may be reduced, the reduction providing a reduced color gamut that is smaller than the native color gamut, the reduced color gamut having a same luminance as the native color gamut. For example, referring to FIGS. 2-3, a gain value of the colors red, green, and/or blue in the native color gamut 202-302 may be reduced to provide the DCI-P3 color gamut 204-304 or the sRGB color gamut 306, which are both smaller than the native color gamut 202-302. The DCI-P3 color gamut 204-304 and the sRGB color gamut 306 may include a same luminance as the native color gamut 202-302 following the reduction. A type of the reduced color gamut may be, but is not limited to, the DCI-P3 color gamut 204-304 or the sRGB color gamut 306.

At 504, reducing the gain value of the at least one primary color may be performed based on a determination that the native color gamut is a WCG. For example, gamut switching may be performed to shrink a size of the native color gamut 202-302 when the native color gamut 202-302 is determined to be larger than a size of a gamut to be displayed by a display panel. In aspects, a WCG such as the native color gamut 202-302 may be switched to a standard color gamut such as the sRGB color gamut 306.

At 506, one or more colors included in the native color gamut may be mapped to the reduced color gamut, the mapping configured to provide a threshold level of color accuracy in the reduced color gamut. For example, referring to FIGS. 2-3, the color cyan may be mapped from the native color gamut 202-302 to the DCI-P3 color gamut 204-304 and/or the sRGB color gamut 306. The mapping may improve a color accuracy (e.g. as indicated by a DE2000 value less than or equal to 3 or some other threshold level of color accuracy) by adjusting a location of the color cyan in the DCI-P3 color gamut 204-304 or the sRGB color gamut 306.

At 508, the mapping (e.g., mapping the color cyan to the post-mapping location in the reduced color gamut) may be performed based on at least one of a GC, IGC, PCC, or 3DLUT. The gain value of the at least one primary color (e.g., red, green, and/or blue) may be reduced in an analog domain and the mapping of the one or more colors (e.g., the color cyan) may be performed in a digital domain. Further, the gain value of the at least one primary color (e.g., red, green, and/or blue) may be reduced by a DDIC and the mapping of the one or more colors may be performed by a DPU.

At 510, a MIPI DCS may be transmitted to a display panel. For example, referring to FIG. 4, the command set may be transmitted, at 404, to enable a display mode of the display panel. The display mode of the display panel may be based on a DCI-P3 color gamut.

At 512, a processor may be switched to a color correction mode for mapping the one or more colors included in the native color gamut to the reduced color gamut. For example, referring to FIG. 4, a configuration of the processor may be switched, at 406, based on the display mode of the display panel. The processor may perform post-processing on the colors of the reduced color gamut to provide a threshold level of color accuracy.

Figure 6:
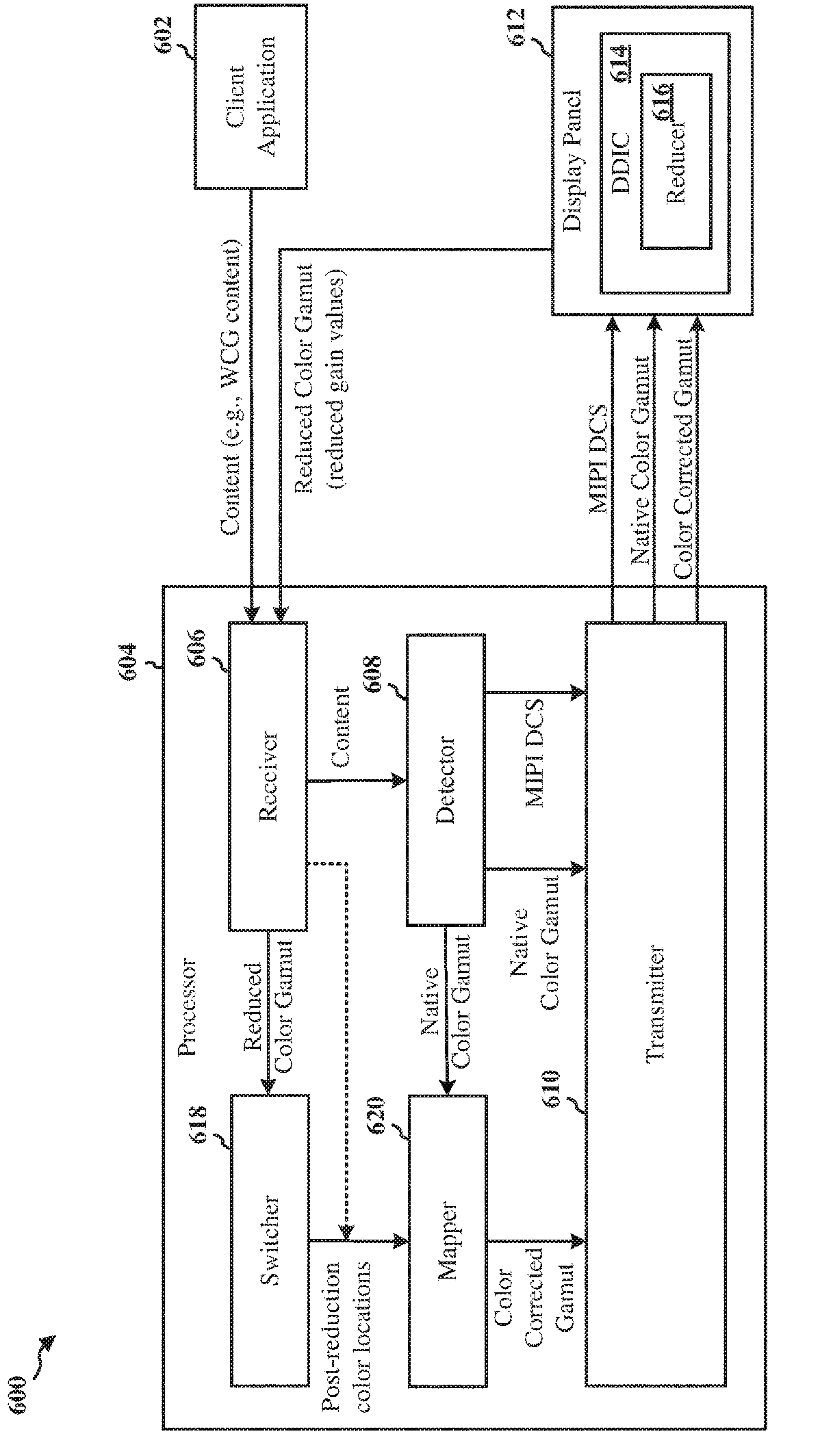
FIG. 6 is a conceptual data flow diagram illustrating the data flow between different means/components in accordance with one or more techniques of this disclosure.

FIG. 6 is a conceptual data flow diagram for a display system 600 illustrating the data flow between different means/components in an example display system. The display system 600 includes a client application 602 that provides content to a processor 604. In examples, the content may be WCG content. The processor 604 may include a receiver 606 that receives the content (e.g., WCG content) from the client application 602. The receiver 606 may provide the content to a detector 608 included in the processor 604. If the detector 608 detects that the content is WCG content, the detector 608 may provide a MIPI DCS to a transmitter 610 included in the processor 604, which may further provide the MIPI DCS to a DDIC 614 of a display panel 612. For example, as described in connection with 510, the transmitter may transmit the command set to the display panel. Based on the command set, a corresponding display mode of the display panel 612 may be enabled.

The detector 608 may additionally detect a native color gamut of the content received from the receiver 606. The detector 608 may indicate the native color gamut to the transmitter 610, which may further indicate the native color gamut to the DDIC 614 of the display panel 612. The DDIC 614 may include a reducer 616 that reduces a gain value of at least one primary color in the native color gamut. For example, as described in connection with 502, the reducer 616 may reduce a gain value of at least one primary color in the native color gamut, the reduction providing a reduced color gamut that is smaller than the native color gamut, the reduced color gamut having a same luminance as the native color gamut.

The receiver 606 may receive the reduced color gamut from the display panel 612 based on the reduced gain value(s) of the at least one primary color. The receiver 606 may provide the reduced color gamut to a switcher 618 included in the processor 604 that switches a configuration of the processor 604 for mapping colors based on the reduced color gamut. For example, as described in connection with 512, the switcher 618 may switch the processor to a color correction mode for mapping the one or more colors included in the native color gamut to the reduced color gamut.

The switcher 618 may provide post-reduction color locations/coordinates associated with the reduced color gamut to a mapper 620 included in the processor 604. In some aspects, the mapper 620 may receive the post-reduction color locations from the receiver 606. The mapper 620 may map the colors of the native color gamut to the reduced color gamut based on the post-reduction color locations. For example, as described in connection with 506, the mapper 620 may map one or more colors included in the native color gamut to the reduced color gamut, where the mapping may be configured to provide a threshold level of color accuracy in the reduced color gamut. Based on the mapping, the mapper 620 may provide a color corrected gamut to the transmitter 610, which may further transmit the color corrected gamut to the display panel 612 for displaying the content generated via the client application 602.

The display system 600 may include additional components that perform each of the blocks of the algorithm in the aforementioned flowchart of FIG. 5. As such, each block in the aforementioned flowchart of FIG. 5 may be performed by a component and the display system 600 may include one or more of those components. The components may be one or more hardware components specifically configured to carry out the stated processes/algorithm, implemented by a processor (e.g., logic and/or code executed by a processor) configured to perform the stated processes/algorithm, stored within a computer-readable medium for implementation by a processor, or some combination thereof.

Accordingly, to provide the threshold level of color accuracy in the smaller color gamut with decreased luminance loss, the display panel (e.g., via the DDIC) may initially reduce the gain value of at least one primary color in the larger color gamut to preserve luminance in the smaller color gamut. Based on the preserved luminance of the smaller color gamut, the processor (e.g. the DPU) may perform a color correction technique on shifted colors within the smaller color gamut via a post-processing procedure. The post-processing procedure may be configured to map shifted colors from the reduction to a more accurate location in the smaller color gamut for providing a threshold level of color accuracy in the smaller color gamut. In this manner, the smaller color gamut may include the threshold level of color accuracy while provided decreased luminance loss, as the smaller color gamut is initially provided via an analog technique that preserves luminance during the initial reduction. Therefore, when the colors are mapped to the post-mapping location in the smaller color gamut based on a digital technique, less luminance loss may occur in comparison to mapping the colors directly from the larger color gamut to the smaller color gamut.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

Various examples have been described. These and other examples are within the scope of the following claims.

The following examples are illustrative only and may be combined with aspects of other embodiments or teachings described herein, without limitation.

Example 1 is a method of switching color gamuts, comprising: reducing a gain value of at least one primary color in a native color gamut, the reduction providing a reduced color gamut that is smaller than the native color gamut, the reduced color gamut having a same luminance as the native color gamut; and mapping one or more colors included in the native color gamut to the reduced color gamut, the mapping configured to provide a threshold level of color accuracy in the reduced color gamut.

Example 2 is the method of Example 1, wherein reducing the gain value of the at least one primary color is performed based on a determination that the native color gamut is a wide color gamut (WCG).

Example 3 is the method of any of Examples 1 and 2, further comprising transmitting a mobile industry processor interface (MIPI) display command set (DCS) (MIPI DCS) to a display panel.

Example 4 is the method of any of Examples 1 to 3, wherein a type of the reduced color gamut is a digital cinema initiatives P3 (DCI-P3) color gamut.

Example 5 is the method of any of Examples 1 to 4, wherein a type of the reduced color gamut is a standard red green blue (sRGB) color gamut.

Example 6 is the method of any of Examples 1 to 5, further comprising switching a display processing unit (DPU) to a color correction mode for mapping the one or more colors included in the native color gamut to the reduced color gamut.

Example 7 is the method of any of Examples 1 to 6, wherein the mapping is performed based on at least one of a gamma correction (GC), an inverse gamma correction (IGC), a polynomial color correction (PCC), or a three-dimensional lookup table (3DLUT).

Example 8 is the method of any of Examples 1 to 7, wherein the gain value of the at least one primary color is reduced in an analog domain and the mapping of the one or more colors is performed in a digital domain.

Example 9 is the method of any of Examples 1 to 8, wherein the gain value of the at least one primary color is reduced by a display driver integrated circuit (DDIC) and the mapping of the one or more colors is performed by a display processing unit (DPU).

Example 10 is an apparatus for switching color gamuts, comprising: a memory; and at least one processor coupled to the memory. The at least one processor is configured to: reduce a gain value of at least one primary color in a native color gamut, the reduction providing a reduced color gamut that is smaller than the native color gamut, the reduced color gamut having a same luminance as the native color gamut; and map one or more colors included in the native color gamut to the reduced color gamut, the mapping configured to provide a threshold level of color accuracy in the reduced color gamut.

Example 11 is the apparatus of any of Examples 1 to 10, wherein the at least one processor is further configured to reduce the gain value of the at least one primary color based on a determination that the native color gamut is a wide color gamut (WCG).

Example 12 is the apparatus of any of Examples 1 to 11, wherein the at least one processor is further configured to transmit a mobile industry processor interface (MIPI) display command set (DCS) (MIPI DCS) to a display panel.

Example 13 is the apparatus of any of Examples 1 to 12, wherein a type of the reduced color gamut is a digital cinema initiatives P3 (DCI-P3) color gamut.

Example 14 is the apparatus of any of Examples 1 to 13, wherein a type of the reduced color gamut is a standard red green blue (sRGB) color gamut.

Example 15 is the apparatus of any of Examples 1 to 14, wherein the at least one processor is further configured to switch a display processing unit (DPU) to a color correction mode for mapping the one or more colors included in the native color gamut to the reduced color gamut.

Example 16 is the apparatus of any of Examples 1 to 15, wherein the at least one processor is further configured to map the one or more colors based on at least one of a gamma correction (GC), an inverse gamma correction (IGC), a polynomial color correction (PCC), or a three-dimensional lookup table (3DLUT).

Example 17 is the apparatus of any of Examples 1 to 16, wherein the gain value of the at least one primary color is reduced in an analog domain and the one or more colors are mapped in a digital domain.

Example 18 is the apparatus of any of Examples 1 to 17, wherein the gain value of the at least one primary color is reduced by a display driver integrated circuit (DDIC) and the one or more colors are mapped by a display processing unit (DPU).

Example 19 is the apparatus of any of Examples 1 to 18, wherein the apparatus is a wireless communication device.

Example 20 is a non-transitory computer-readable medium storing computer executable code. When executed by the at least one processor, the code causes the at least one processor to: reduce a gain value of at least one primary color in a native color gamut, the reduction providing a reduced color gamut that is smaller than the native color gamut, the reduced color gamut having a same luminance as the native color gamut; and map one or more colors included in the native color gamut to the reduced color gamut, the mapping configured to provide a threshold level of color accuracy in the reduced color gamut.

What is claimed is:

1. A method of switching color gamuts, comprising:
- reducing, in an analog domain, a gain value of at least one primary color in a native color gamut, the reduction providing a reduced color gamut that is smaller than the native color gamut, the reduced color gamut having a same luminance as the native color gamut; and
- mapping, in a digital domain, one or more colors included in the native color gamut to the reduced color gamut, the mapping configured to provide a threshold level of color accuracy in the reduced color gamut.

2. The method of claim 1, wherein reducing the gain value of the at least one primary color in the native color gamut comprises:
- reducing the gain value of the at least one primary color based on a determination that the native color gamut is a wide color gamut (WCG).

3. The method of claim 1, further comprising:
- transmitting a mobile industry processor interface (MIPI) display command set (DCS) (MIPI DCS) to a display panel before the reduction of the gain value of the at least one primary color in the native color gamut.

4. The method of claim 1, wherein a type of the reduced color gamut is a digital cinema initiatives P3 (DCI-P3) color gamut.

5. The method of claim 1, wherein a type of the reduced color gamut is a standard red green blue (sRGB) color gamut.

6. The method of claim 1, further comprising:
- switching a display processing unit (DPU) to a color correction mode before the mapping the one or more colors included in the native color gamut to the reduced color gamut.

7. The method of claim 1, wherein mapping the one or more colors included in the native color gamut to the reduced color gamut comprises:
- mapping the one or more colors based on at least one of a gamma correction (GC), an inverse gamma correction (IGC), a polynomial color correction (PCC), or a three-dimensional lookup table (3DLUT).

8. The method of claim 1, wherein reducing the gain value of the at least one primary color in the native color gamut comprises:
- reducing the gain value of the at least one primary color by a display driver integrated circuit (DDIC), wherein mapping the one or more colors included in the native color gamut to the reduced color gamut comprises:
  - mapping the one or more colors by a display processing unit (DPU).

9. An apparatus for switching color gamuts, comprising:
- a memory; and
- at least one processor coupled to the memory and configured to:
  - reduce, in an analog domain, a gain value of at least one primary color in a native color gamut, the reduction providing a reduced color gamut that is smaller than the native color gamut, the reduced color gamut having a same luminance as the native color gamut; and
  - map, in a digital domain, one or more colors included in the native color gamut to the reduced color gamut, the mapping configured to provide a threshold level of color accuracy in the reduced color gamut.

10. The apparatus of claim 9, wherein, to reduce the gain value of the at least one primary color, the at least one processor is configured to:
- reduce the gain value of the at least one primary color based on a determination that the native color gamut is a wide color gamut (WCG).

11. The apparatus of claim 9, wherein the at least one processor is further configured to:
- transmit a mobile industry processor interface (MIPI) display command set (DCS) (MIPI DCS) to a display panel before the reduction of the gain value of the at least one primary color in the native color gamut.

12. The apparatus of claim 9, wherein a type of the reduced color gamut is a digital cinema initiatives P3 (DCI-P3) color gamut.

13. The apparatus of claim 9, wherein a type of the reduced color gamut is a standard red green blue (sRGB) color gamut.

14. The apparatus of claim 9, wherein the at least one processor is further configured to:

switch a display processing unit (DPU) to a color correction mode before the mapping the one or more colors included in the native color gamut to the reduced color gamut.

15. The apparatus of claim 9, wherein, to map the one or more colors, the at least one processor is configured to:

map the one or more colors based on at least one of a gamma correction (GC), an inverse gamma correction (IGC), a polynomial color correction (PCC), or a three-dimensional lookup table (3DLUT).

16. The apparatus of claim 9, wherein, to reduce the gain value of the at least one primary color in the native color gamut, the at least one processor is configured to:

reduce the gain value of the at least one primary color by a display driver integrated circuit (DDIC), wherein, to map the one or more colors included in the native color gamut to the reduced color gamut, the at least one processor is configured to:

map the one or more colors by a display processing unit (DPU).

17. The apparatus of claim 9, wherein the apparatus is a wireless communication device.

18. A computer-readable medium storing computer executable code, the code when executed by at least one processor, causes the at least one processor to:

reduce, in an analog domain, a gain value of at least one primary color in a native color gamut, the reduction providing a reduced color gamut that is smaller than the native color gamut, the reduced color gamut having a same luminance as the native color gamut; and map, in a digital domain, one or more colors included in the native color gamut to the reduced color gamut, the mapping configured to provide a threshold level of color accuracy in the reduced color gamut.

* * * * *